United States Patent
Wieners et al.

(10) Patent No.: US 7,799,436 B2
(45) Date of Patent: Sep. 21, 2010

(54) BIAXIALLY ORIENTED POLYOLEFINS WITH A REDUCED BLOCKING TENDENCY WITH RESPECT TO COLD SEALING PRODUCTS

(75) Inventors: Gerhard Wieners, Frankfurt (DE); Susanne Holzer, Ottweiler (DE); Jürgen Schischko, Neunkirchen-Furpach (DE)

(73) Assignee: Trespaphan GmbH, Neunkirchen (DE)

( * ) Notice: Subject to any disclaimer, the term of this patent is extended or adjusted under 35 U.S.C. 154(b) by 756 days.

(21) Appl. No.: 10/257,002

(22) PCT Filed: Apr. 5, 2001

(86) PCT No.: PCT/EP01/03858

§ 371 (c)(1),
(2), (4) Date: Oct. 3, 2002

(87) PCT Pub. No.: WO01/78979

PCT Pub. Date: Oct. 25, 2001

(65) Prior Publication Data

US 2003/0124344 A1    Jul. 3, 2003

(30) Foreign Application Priority Data

Apr. 13, 2000 (DE) ............... 100 18 442

(51) Int. Cl.
- *B32B 33/00* (2006.01)
- *B32B 7/12* (2006.01)
- *B32B 27/00* (2006.01)
- *B32B 27/08* (2006.01)
- *B65B 51/10* (2006.01)

(52) U.S. Cl. ............ 428/500; 428/41.8; 428/352; 428/515; 53/477

(58) Field of Classification Search ........ 428/515, 428/516, 41.8, 352; 53/477; *B32B 7/06*
See application file for complete search history.

(56) References Cited

U.S. PATENT DOCUMENTS

| | | | |
|---|---|---|---|
| 4,590,125 A | | 5/1986 | Balloni et al. |
| 5,091,272 A | * | 2/1992 | Treger ............ 429/62 |
| 5,155,160 A | * | 10/1992 | Yeh et al. ......... 524/487 |
| 5,346,735 A | * | 9/1994 | Logan et al. ....... 428/36.7 |
| 5,482,780 A | | 1/1996 | Wilkie et al. |
| 6,033,514 A | * | 3/2000 | Davis et al. ....... 156/244.11 |
| 6,042,913 A | * | 3/2000 | Miranda et al. ..... 428/40.1 |
| 6,312,825 B1 | * | 11/2001 | Su et al. .......... 428/484.1 |
| 6,503,611 B1 | * | 1/2003 | Chang et al. ....... 428/213 |
| 6,726,998 B2 | * | 4/2004 | Su et al. .......... 428/461 |

FOREIGN PATENT DOCUMENTS

| | | |
|---|---|---|
| DE | 198 36 657 A1 | 2/2000 |
| WO | WO 00/32395 A1 | 6/2000 |

OTHER PUBLICATIONS

Bakerhughes.com "Polywax® Polyethylene"(undated).*

* cited by examiner

*Primary Examiner*—Sheeba Ahmed
(74) *Attorney, Agent, or Firm*—ProPat, L.L.C.

(57) ABSTRACT

The invention relates to a multilayered biaxially oriented polyolefin film in the form of a release film in a laminate which is coated on an outer surface thereof with a cold seal adhesive. The release film comprises a base layer and at least one outer layer. At least one layer of the release film contains wax having an average molecular weight Mn of 200-3000. The invention also relates to a method for producing the film and the use thereof.

22 Claims, No Drawings

BIAXIALLY ORIENTED POLYOLEFINS WITH A REDUCED BLOCKING TENDENCY WITH RESPECT TO COLD SEALING PRODUCTS

The invention relates to a polypropylene film having a reduced tendency to block against cold-seal adhesives.

Foods and other packaged goods are frequently sealed in packaging films, with it being necessary to use elevated temperatures, generally above 100° C., in order to produce the seal seam. Various packaged goods, such as, for example, chocolate, change under the effect of temperature. For applications of this type, use is nowadays made of so-called cold-sealing products, which are applied in thin layers, frequently not over the entire area, but instead only in the region of the seal seam. The cold-sealing products are designed in such a way that they can be welded even at room temperature or only slightly elevated temperature virtually only through the use of pressure. These cold-sealing products are preferably applied immediately before or after printing of the films. The films or film composites which have been printed and coated with cold-seal adhesive are then stored in the form of rolls until used. Sticking or blocking of the outside of the composite to the cold-seal adhesive on the inside of the film composite must be avoided during this period (release action). In addition, a positive effect on the outward appearance through corresponding gloss is required.

The desired release action can be achieved in various ways. Firstly, so-called release coatings are applied, it being necessary, in order to achieve adequate gloss, to apply comparatively large amounts of the coating in order to compensate for irregularities caused by varying thickness of the ink application due to the print image. The use of release coatings requires the application of corresponding coating solutions or dispersions, which have to be dried using an input of energy. In addition, careful control of the processing conditions is necessary in order to be able to ensure high optical quality of the coating application.

Furthermore, it is also possible for transparent, high-gloss films to be laminated with a base film which, owing to its formulation and/or surface structure, has only a low tendency to block against the cold-seal adhesive (release film). The appearance of the composite here is determined by the gloss of the applied film. Furthermore, the laminated-on top film can contribute towards the rigidity of the film composite.

For different applications, various cold-seal adhesives have been developed which in some cases differ considerably from one another in composition and properties. The requirements of the release coatings and films differ correspondingly. Depending on the application, considerable application of force may be necessary, in spite of the release coating or films, to unroll the films or film composite with a cold-seal coating. In some cases, delamination of the release coating, possibly including adherent printing ink, occurs. This results in defects in the function of the cold-seal adhesive due to partial covering of the adhesive by the transferred ink and coating layers and in corresponding flaws in the print image. The storage conditions (temperature, atmospheric humidity) can affect the susceptibility to and the degree of blocking.

The prior art does not include any processes which prevent the tendency of any desired combinations of cold-sealing product and release coating or film towards blocking. It is therefore necessary to use complex empirical series investigations to identify release coatings or films which are suitable for a given cold-seal adhesive.

Suitable release films are known. Biaxially oriented polypropylene films (BOPP films) whose top layers consist of PP homopolymers and include small proportions of polysiloxanes are preferably employed for this purpose.

The present invention therefore has the object of providing a transparent, visually appealing polyolefin film which has a good release action against cold-seal coatings, where this release action should exist against a broad range of cold-seal adhesives. In addition, the film should have good adhesion on the opposite surface to printing inks or lamination adhesives in order that the release film can reliably be laminated on its second surface to a printed or unprinted BOPP base film. It must be possible for a roll of the film composite with a cold-seal coating to be unrolled with low forces and without ink transfer.

This object is achieved through the use of a multilayered biaxially oriented polyolefin film comprising a base layer and at least one top layer as release film in a film laminate, where the film comprises a wax in at least one layer, with the inner layer intended for lamination being essentially free from wax. The sub-claims indicate preferred embodiments of the invention.

The term inside or inner surface or inner layer below is taken to mean the side or surface or layer of the release film which is laminated to the base film. In packaging applications, this side usually faces the packaged goods and is therefore also known as the inside. The outside or outer surface or outer layer is correspondingly the opposite side or the opposite top layer of the release film, whose surface is in contact with the cold-seal adhesive after the laminate has been rolled up.

The invention furthermore relates to a laminate comprising a base film and the release film according to the invention, which are joined to give a laminate, for example by means of a suitable lamination adhesive. One surface of the base film is usually provided with the cold-seal adhesive. The opposite side is laminated to the release film. When the laminate is rolled up, the outer surface of the release film and the base-film surface coated with the cold-seal adhesive are in contact with one another.

In the context of the present invention, it has been found that waxes in a polyolefin film have very good release properties against cold-seal adhesives. The laminate comprising coated base film and wax-containing release film can be unwound in an excellent manner after storage in roll form without damage occurring to the cold-sealing layer applied beforehand. The release film must, in accordance with the invention, be formulated with the wax in certain layers in order to guarantee the desired release action against the cold-seal adhesive layer. Individual embodiments of the invention with respect to its layer structure and its formulation with wax are described below.

In one embodiment of the invention, the release film has a two- or three-layered structure comprising a base layer and at least one top layer and comprises a wax in the base layer. The amount of wax in the base layer is generally in the range from 0.01 to 15% by weight, based on the weight of the base layer. This embodiment is preferably corona-, flame- or plasma-treated on the inner surface. It is known from the prior art that waxes and other conventional additives are able to migrate within the polymers from which a film is built up. It is also known that they preferably migrate toward the surface of the film which has been corona-, flame- or plasma-treated, furthermore that migration-capable additives mutually influence each other in their migration behaviour. It was therefore obvious to assume that the waxes would preferably migrate, in an undesired manner, out of the base layer toward the treated inner surface, where they would impair the adhesion of the lamination adhesive or of the printing inks.

Surprisingly, it has now been found that the influence of the waxes does not hinder processing of the release film into the laminate or composite. After the composite coated with cold-seal adhesive has been wound up, the roll can be stored and subsequently unwound without problems. This has been observed even if further migration-capable additives are present in the film and the inner surface of the film has been corona-, flame- or plasma-treated.

In a preferred embodiment, the release film is a three-layered film which comprises wax, generally in an amount of from 0.01 to 15% by weight, in its base layer and has top layers on both sides. One of the two top layers has preferably been plasma-, flame- or corona-treated, referred to below as the inner top layer. This treated inner surface is optionally provided with reverse printing before lamination with the base film. It has been found that the wax in the base layer does not impair the adhesion of printing inks. In a preferred embodiment, the treated inner surface of the release film remains unprinted. In any case, the base film is laminated to this inner top layer of the release film by means of suitable lamination adhesives. It has been found that the adhesion of the lamination adhesive and the interlayer adhesion of the laminate can be significantly improved by the surface treatment of the inner top layer. The adhesion-improving action of a surface treatment was known per se in the prior art. However, it could not have been predicted for the wax-modified film whether the surface treatment of the inner top layer simultaneously promotes migration of the wax to this surface. A migration-promoting action of this type would result in an accumulation of wax on this inner surface and would adversely affect both the adhesion of the printing inks and the adhesion of the lamination adhesive. In addition, the desired release action on the opposite outer side would be impaired, since comparatively small amounts of wax are able to reach the latter. Surprisingly, the wax-containing release film exhibited a good release action on the outside in the composite, and at the same time the adhesion-improving action to printing inks and lamination adhesives on the inside was achieved through the surface treatment. The three-layered release film is therefore highly suitable for lamination to a base film with cold-seal adhesive. The finished composite can easily be processed from the roll. During unwinding, it is not necessary to use extreme forces, which avoids the risk of stretching and adverse effects on the print image. The cold-seal adhesive layer remains present without flaws after the composite has been unwound. The composite can be processed into wrap packaging without problems.

In the course of further investigations, it was found that it is in addition preferred not to subject the outer surface of the three-layered release film to treatment in order to increase the surface tension, for example by flame, corona or plasma. A variant of the release film of this type was produced in order to ensure uniform migration to the outside and inside of the film. However, it was found that although the release film treated on both surfaces has the desired good adhesion on the inside, the film simultaneously, however, has a very strong tendency toward blocking. After processing into the composite, the adhesion between the outer surface of the release film and the cold-seal adhesive layer of the base film was very high. This hindered further processing of the roll. In some cases, stretching during unwinding and flaws in the adhesive coating occurred.

In a further preferred embodiment of the invention, the release film additionally has an interlayer between the base layer and the top layer, i.e. these embodiments of the release film have an at least three-layered, preferably four-layered, if desired also five-layered structure. The amounts of wax in the interlayer are generally in the range from 0.01 to 10% by weight, based on the weight of the interlayer. The base layer in these embodiments remains essentially free from wax. Instead, the wax is incorporated into the or one of the two interlayers. It was found here that the amount of wax in the wax-containing interlayer only had to be increased slightly, or not at all, compared with the content in the case of incorporation into the base layer. This embodiment thus has the additional advantage that a significant saving of wax is possible, based on the total weight of the film, with the release action still being excellent.

This release film with interlayer is processed into a laminate in such a way that the top layer which covers the wax-containing interlayer forms the outside of the laminate. These layers are therefore referred to below as the outer top layer or the outer interlayer. Correspondingly, the opposite layers are the inner top layer or the inner interlayer, if present. This embodiment of the invention is also preferably surface-treated on the inside, i.e. on the surface of the inner top layer, by plasma, corona or flame, it simultaneously being preferred not to subject the outer top layer to corresponding treatment. The same effects as for the three-layered release film described above arise here correspondingly. The surface treatment of the inner top layer improves the adhesion of printing inks and/or lamination adhesives, while the corresponding treatment on the opposite outer surface has adverse effects, in particular produces excessive adhesion to the cold-seal adhesive, i.e. impairs the release action, preventing processing of the laminate.

In the case of interlayers on both sides, it is preferred to add a wax only to the outer interlayer, while no wax is added to the opposite inner interlayer.

During processing of the release film with interlayer into the laminate according to the invention, a base film is laminated to the inside of the release film by means of a lamination adhesive, the cold-seal adhesive is applied to the remaining surface of the base film, and the laminate is wound up to form a roll.

In a further embodiment of the invention, the release film alternatively or additionally comprises wax in its outer top layer. The amount of wax in the top layer is generally in the range from 0.01 to 5% by weight, based on the weight of the top layer. This feature can be implemented in two-, three-, four- and five-layered structures. The additional layers are preferably free from wax, but an outer interlayer present may, if desired, additionally comprise wax, with the wax content in the interlayer then being from 0.01 to 10% by weight, based on the weight of the interlayer. The amounts of wax required (absolute amount, based on the film) in these embodiments are considerably below those when using the waxes in the base layer. Surface treatments by means of flame, plasma or corona are, as described above, preferred for the inner wax-free top layer or surface. The lamination with the base film to the, preferably treated, inner top layer is carried out analogously. These embodiments with wax in the top layer have the additional advantage that the release action is already present a short time after production of the release film.

Suitable waxes for the present invention are preferably polyethylene waxes or paraffins.

Polyethylene waxes are low-molecular-weight polymers which are essentially built up from ethylene units and are partly or highly crystalline. The polyethylene waxes may be extended chains or branched, with relatively short side chains predominating. In general, polyethylene waxes are prepared by direct polymerization of ethylene, if desired with use of regulators, or by depolymerization of polyethylenes of relatively high molecular weight. In accordance with the invention, the polyethylene waxes have a mean molecular weight Mn (number average) of from 200 to 5000, preferably from 300 to 3500, particularly preferably from 400 to 2500, and preferably have a molecular weight distribution (polydispersity) Mw/Mn of less than 3, preferably 1 2. The melting point is generally in the range from 70 to 150° C., preferably from 80 to 100° C.

Paraffins include macrocrystalline paraffins (paraffin waxes) and microcrystalline paraffins (microwaxes). Macrocrystalline paraffins are obtained from vacuum distillate fractions on conversion thereof into lubricating oils. Microcrystalline paraffins originate from the residues of vacuum distillation and the sediments of paraffinic crude oils (deposition paraffins). Macrocrystalline paraffins consist predominantly of n-paraffins which additionally contain isoparaffins, naphthenes and alkylaromatic compounds, depending on the degree of refining. Microcrystalline paraffins consist of a mixture of hydrocarbons which are predominantly solid at room temperature. In contrast to macrocrystalline paraffins, isoparaffins and naphthenic paraffins predominate. Microcrystalline paraffins are distinguished by the presence of crystallization-inhibiting, highly branched isoparaffins and naphthenes. For the purposes of the invention, paraffins having a melting point of from 60 to 100° C., preferably from 60 to 85° C., are particularly suitable.

The waxes are preferably incorporated into the film or into the respective layers via a concentrate comprising polyolefin and wax, so-called compounds or masterbatches. The wax concentration in the masterbatch or compound is from 5 to 40% by weight, based on the masterbatch.

The base layer of the various embodiments of the release film described above is generally built up from a polyolefin, preferably from propylene polymers. The base layer generally comprises at least 70% by weight, preferably from 70 to <100% by weight, in particular from 80 to 99.4% by weight, in each case based on the base layer, of a propylene polymer.

In general, the propylene polymer comprises at least 90% by weight, preferably from 94 to 100% by weight, in particular from 98 to 100% by weight, of propylene. The corresponding comonomer content of at most 10% by weight or from 0 to 6% by weight or from 0 to 2% by weight generally consists, if present, of ethylene. The data in % by weight in each case relate to the propylene polymer. Preference is given to isotactic propylene homopolymers having a melting point of from 140 to 170° C., preferably from 155 to 165° C., and a melt flow index (measurement DIN 53 735 at a load of 21.6 N and 230° C.) of from 1.0 to 10 g/10 min, preferably from 1.5 to 6.5 g/10 min. The n-heptane-soluble content of the polymer is generally from 1 to 10% by weight, preferably 2-5% by weight, based on the starting polymer.

The molecular weight distribution of the propylene polymer can vary within broad limits, depending on the area of application. The ratio between the weight average molecular weight $M_w$ and the number average molecular weight $M_n$ is generally between 1 and 15, preferably from 2 to 6. Such a narrow molecular weight distribution is achieved, for example, by peroxidic degradation thereof or by the preparation of the polypropylene by means of suitable metallocene catalysts.

In addition, the base layer may comprise conventional additives, such as neutralizers, stabilizers, antistatics and/or lubricants, in effective amounts in each case.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having from 10 to 20 carbon atoms which are substituted by ω-hydroxy-($C_1$-$C_4$)alkyl groups, N,N-bis(2-hydroxyethyl)alkylamines having from 10 to 20 carbon atoms, preferably from 12 to 18 carbon atoms, in the alkyl radical being particularly suitable. The effective amount of antistatic is in the range from 0.05 to 0.5% by weight.

Lubricants are higher aliphatic acid amides, higher aliphatic acid esters, in particular monoglyceryl esters, and metal soaps, as well as polydimethylsiloxanes. The effective amount of lubricant is in the range from 0.01 to 3% by weight, preferably from 0.02 to 1% by weight. Particularly suitable is the addition of higher aliphatic acid amides, in particular erucamide and stearylamide, in the range from 0.01 to 0.25% by weight to the base layer. Polydimethylsiloxanes, in particular polydimethylsiloxanes having a viscosity of from 5000 to 1,000,000 $mm^2$/s, are preferably added in the range from 0.02 to 3.0% by weight.

Stabilizers which can be employed are the conventional compounds which have a stabilizing action for polymers of ethylene, propylene and other α-olefins. Their added amount is between 0.05 and 2% by weight. Particularly suitable are phenolic and phosphitic stabilizers. Phenolic stabilizers having a molecular weight of greater than 500 g/mol are preferred, in particular pentaerythrityl tetrakis-3-(3,5-di-tert-butyl-4-hydroxyphenyl)propionate or 1,3,5-trimethyl-2,4,6-tris (3,5-di-tert-butyl-4-hydroxybenzyl)benzene. Suitable phosphitic stabilizers are Ultranox 626, Irgafos 168 and Weston 619, preferably Irgafos 168. Phenolic stabilizers alone are employed in an amount of from 0.1 to 0.6% by weight, in particular from 0.1 to 0.3% by weight, and phenolic and phosphitic stabilizers are employed in a ratio of from 1:4 to 2:1 and in a total amount of from 0.1 to 0.4, in particular from 0.1 to 0.25.

Neutralizers are preferably dihydrotalcite, calcium stearate and/or calcium carbonate having a mean particle size of at most 0.7 μm, a maximum particle size of less than 10 μm and a specific surface area of at least 40 $m^2$/g.

The above data in % in each case relate to the weight of the base layer.

The top layer or top layers of the release film according to the invention is or are built up from olefinic polymers and generally comprise(s) from 70 to 100% by weight of olefinic polymers, preferably from 85 to <100% by weight.

Examples of suitable olefinic polymers are
a propylene homopolymer
a copolymer of
    ethylene and propylene or
    ethylene and 1-butylene or
    propylene and 1-butylene or
a terpolymer of
    ethylene and propylene and 1-butylene or
a mixture or blend of two or more of the said homopolymers, copolymers and terpolymers, where particular preference is given to
random ethylene-propylene copolymers having
    an ethylene content of from 1 to 10% by weight, preferably from 2.5 to 8% by weight, or
random propylene-1-butylene copolymers having
    a butylene content of from 2 to 25% by weight, preferably from 4 to 20% by weight,
in each case based on the total weight of the copolymer, or
random ethylene-propylene-1-butylene terpolymers having
    an ethylene content of from 1 to 10% by weight, preferably from 2 to 6% by weight, and a 1-butylene content of from 2 to 20% by weight, preferably from 4 to 20% by weight,
in each case based on the total weight of the terpolymer,
or
a blend of an ethylene-propylene-1-butylene terpolymer and a propylene-1-butylene copolymer
having an ethylene content of from 0.1 to 7% by weight and a propylene content of from 50 to 90% by weight and a 1-butylene content of from 10 to 40% by weight,
in each case based on the total weight of the polymer blend.

The above-described copolymers and/or terpolymers employed in the top layer(s) generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the above-mentioned melt flow indices are measured at 230° C. and a force of 21.6 N (DIN 53 735).

The propylene homopolymer employed in the top layer(s) generally has a melt flow index of from 1.5 to 15 g/10 min, preferably from 3 to 10 g/10 min. The melting point is in the range from 140 to 170° C.

Preference is given to isotactic propylene homopolymers. All the above-mentioned melt flow indices are measured at 230° C. and a force of 21.6 N (DIN 53 735).

If desired, the additives described above for the base layer, such as antistatics, neutralizers, lubricants and/or stabilizers, and, if desired, additionally antiblocking agents, may be added to the top layer(s). The data in % by weight then relate correspondingly to the weight of the top layer.

Suitable antiblocking agents are inorganic additives, such as silicon dioxide, calcium carbonate, magnesium silicate, aluminium silicate, calcium phosphate and the like, and/or incompatible organic polymers, such as polyamides, polyesters, polycarbonates and the like, preference being given to benzoguanamine-formaldehyde polymers, silicon dioxide and calcium carbonate. The effective amount of antiblocking agent is in the range from 0.1 to 2% by weight, preferably from 0.1 to 0.8% by weight. The mean particle size is between 1 and 6 μm, in particular between 2 and 5 μm, particles having a spherical shape, as described in EP-A-0 236 945 and DE-A-38 01 535, being particularly suitable.

In the embodiments having a top layer on both sides, the top layers can be built up from the same or different polymers of those described above.

For the outer top layer (release side), preference is given to propylene homopolymers, while for the inner top layer (lamination side), the propylene copolymers and/or terpolymers described are preferably employed.

In a preferred embodiment, the outer top layer (release side) consists of a propylene homopolymer having a melt flow index of from 4 to 10 g/10 min and comprises a polyethylene wax having a molecular weight of from 400 to 2500 and having a polydispersity Mw/Mn of from 1 to 2 and having a melting point of from 80 to 100° C. From 0.05 to 0.2% of suitable antioxidants and 0.03% of dihydrotalcite DHT4A are preferably added to this wax-containing top layer. In particular, this top layer additionally comprises from 0.1 to 1.0% by weight of antiblocking agent, preferably based on substantially spherical silicon dioxide particles having a mean particle size of between 2 and 10 μm, preferably from 3 to 6 μm.

The release film according to the invention comprises the layers described above. For the purposes of the present invention, the base layer is taken to mean the layer which has the greatest layer thickness and in general makes up at least 40% of the total thickness. Top layers are the outer layers, whose thickness is generally greater than 0.1 μm. The thickness of the top layers is preferably from 0.3 to 3 μm, in particular from 0.4 to 1.5 μm, with it being possible for top layers on both sides to have identical or different thicknesses. The interlayer(s) is/are obviously applied between the base layer and the top layer. The interlayers generally have a thickness of between 0.5 and 15 μm, preferably from 1.0 to 10 μm.

The total thickness of the release film according to the invention can vary within broad limits and depends on the intended use. It is preferably from 4 to 80 μm, in particular from 5 to 60 μm, in particular from 6 to 25 μm, with the base layer preferably making up from 60 to 99% of the total thickness of the release film according to the invention.

The invention furthermore relates to a process for the production of the release film according to the invention by the coextrusion process, which is known per se.

This process is carried out by melting the materials for the individual layers of the film with the aid of from two to four or more extruders and coextruding the corresponding melts jointly through a flat-film die, taking off the resultant film over one or more rolls for solidification, subsequently biaxially stretching (orienting) the film, heat-setting the biaxially stretched film and, if desired, corona-, plasma- or flame-treating the surface layer intended for the treatment.

The biaxial stretching (orientation) in the longitudinal and transverse directions is carried out simultaneously or consecutively, with consecutive biaxial stretching, in which stretching is firstly carried out longitudinally (in the machine direction) and then transversely (perpendicular to the machine direction), being preferred.

As is conventional in the coextrusion process, the polymer or polymer mixture of the individual layers is in each case firstly compressed and liquefied in an extruder, it being possible for any additives added already to be present in the polymer or polymer mixture. The wax is preferably incorporated into the respective layer via a melt-homogenized compound or masterbatch. The melts are then forced simultaneously in layers on one another through a flat-film die (slot die), and the extruded multilayered film is taken off on one or more take-off rolls at a temperature of from 10 to 100° C., preferably from 20 to 50° C., during which it cools and solidifies.

The pre-film obtained in this way is then stretched longitudinally and transversely to the extrusion direction, which results in alignment of the molecule chains. The longitudinal stretching is advantageously carried out with the aid of two rolls running at different speeds corresponding to the target stretching ratio, with the stretching being carried out at a temperature of from 80 to 150° C. and with a stretching ratio in the range from 4 to 8, preferably from 5 to 6. The transverse stretching is carried out at a temperature of from 120 to 170° C. with the aid of an appropriate tenter frame, the transverse stretching ratios being in the range from 5 to 10, preferably from 7 to 9.

The biaxial stretching of the film is followed by heat-setting (heat treatment) thereof, in which the film is held at a temperature of from 100 to 160° C. for from about 0.1 to 10 seconds. The film is subsequently wound up in a conventional manner by means of a wind-up unit.

After the biaxial stretching, the inner surface of the film (i.e. the one intended for lamination) is preferably corona-, plasma- or flame-treated by one of the known methods. The treatment intensity is generally in the range from 35 to 50 mN/m, particularly preferably from 37 to 45 mN/m.

In the case of corona treatment, an advantageous procedure is to pass the film between two conductor elements serving as electrodes, with such a high voltage, usually an alternating voltage (from about 5 to 20 kV and from about 5 to 30 kHz), being applied between the electrodes that spray or corona discharges can occur. The spray or corona discharge ionizes the air above the film surface, which reacts with the molecules of the film surface, causing the formation of polar inclusions in the essentially non-polar polymer matrix.

The release film is further processed into the laminate according to the invention and the corresponding packaging made from the laminate by one of the processes described below:

For the production of the laminate, a base film which has been print-pretreated on one or both sides is selected and preferably printed on one or the print-pretreated side with commercially available printing inks. The release film is subsequently laminated with its inside onto this printed side with the aid of commercially available lamination adhesives. The cold-seal adhesive is subsequently applied to the second surface of the base film. Depending on the nature of the cold-seal adhesive, this second surface of the base film may also be pretreated. This depends on the processing procedures for the cold-seal adhesive. The printed laminate coated with cold-seal adhesive is wound up into a roll and subsequently processed further for packaging.

Also possible in principle is the so-called reverse print process, in which it is not the base film, but instead the release film according to the invention that is printed on its inside by means of so-called reverse print. Otherwise, the analogous procedure to that described above is followed with respect to the lamination process and the cold-sealing application.

Various films are suitable as base films depending on the application. Thus, suitable base films are transparent, metallized, white-coloured or opaque biaxially oriented polypropylene films as well as biaxially oriented polyethylene terephthalate films, polyethylene films and also polypropylene cast films which, depending on the cold-seal adhesive to be employed, have been print-pretreated on both sides or only on one side on the outside to be printed. The use of the release film according to the invention is not restricted to the types of base film mentioned. The release film according to the invention can advantageously be employed everywhere where a base or support film is provided on the outside with an adhesive layer which develops excessive adhesion to the opposite surface during winding up. Preferred embodiments of the base film are transparent, metallized, white-coloured or opaque biaxially oriented polypropylene films, which are known per se in the prior art.

The base film can be printed with a multiplicity of different ink systems by a very wide variety of processes. Thus, both one- and two-component systems are suitable. The one-component ink systems include those based on polyvinylbutyral, nitrocellulose and cellulose acetate propionate, while the two-component ink systems include those based on epoxy resins and polyurethane resins. The use of primers or adhesion promoters in order to improve ink adhesion may be advantageous here.

The lamination of the base film with the release film according to the invention can be carried out either using solvent-containing or solvent-free lamination adhesives.

Furthermore, so-called extrusion lamination is also possible. In this process, base and release films are bonded to one another after the printing operation by extruding a suitable low-melting thermoplastic in a thin layer between the films to be laminated, and pressing the two films with the plastic melt in between firmly onto one another. On solidification of the thermoplastic, the two films are strongly bonded to the latter and thus to one another. The process of extrusion lamination is known per se in the prior art. The plastic melt employed in extrusion lamination is preferably polyethylene.

Suitable cold-seal adhesives are a large number of commercially available cold-seal adhesives. Cold-seal adhesives of this type can be prepared on the basis of natural latices and on the basis of synthetic latices or by combination of natural and synthetic latices, which differ with respect to the suspension media employed, the prescribed processing conditions, the storage stability, the anchoring to the support film and the seal seam strength and through the sealing pressures and temperatures necessary for sealing. Suitable, inter alia, are the cold-seal adhesives from Croda, Swale, Atofindley 1592, 1380 and the like. However, the use and the advantageous release action of the film according to the invention are in no way restricted to the cold-seal adhesives indicated.

The various processing steps for the production of the laminate according to the invention can in principle be carried out in separate operations. Thus, for example, the production of the composite can be carried out independently of the printing and independently of the application of the cold-seal adhesive. However, preference is given to processes in which wherever possible a plurality or all of the said steps can be carried out in one operation. It is in any case necessary to apply the cold-seal adhesive only after lamination into the composite in order to prevent blocking of the printed and coated base film.

The following measurement methods were used to characterize the raw materials and the films:

Melt Flow Index

The melt flow index was measured in accordance with DIN 53 735 at a load of 21.6 N and 230° C.

Melting Point

DSC measurement, maximum of the melting curve, heating rate 20° C./min.

Surface Tension

The surface tension was determined by the so-called ink method (DIN 53 364).

Printability

The corona-treated films were printed 14 days after production (short-term assessment) or six months after production (long-term assessment). The ink adhesion was assessed by means of the adhesive-tape test. If it was possible to remove a little ink by means of an adhesive tape, the ink adhesion was assessed as moderate, and if significant ink removal was achieved, it was assessed as poor.

Measurement of the Blocking Behaviour

One or more film samples which are to be investigated with respect to their release properties are stacked alternately with a film sample which has been coated with cold-seal adhesive on its surface in such a way that the outside (release side) of the film sample to be tested is in contact with the cold-seal adhesive. In order to be able to clamp the film pieces which are possibly blocking against one another in the tensile-testing machine, a strip with a width of a few centimeters is in each case covered by means of, for example, paper. If the film sample itself or a composite produced therefrom carries the cold-seal adhesive, every second contact surface is completely covered in order to be able to separate the film samples for the purposes of measurement.

The stack of samples is pressed for 24 hours at room temperature under a pressure of 100 N/cm$^2$ by means of a tilt-lever press. The film samples are then separated, cut into strips with a width of 30 mm and clamped in a tensile-testing machine (for example Zwick) in such a way that the release film and the base film which is coated on its surface with cold-seal adhesive are separated from one another at an angle of twice 90°. The force required to separate the film layers is measured. The average of three measurements and the extent of any transfer of cold-seal adhesive to the release film are used for the assessment.

Measurement of the Anchoring of the Cold-seal Adhesive

A sample of the release film is printed on the inside and/or laminated to a printed base film, the printed inside or the base film of the composite is subsequently coated with cold-seal adhesive in accordance with the processing instructions and, if necessary, dried, and allowed to condition through storage. The cold-seal adhesive is subsequently brought into contact under uniform pressure with an adhesive tape (for example Tesa or lithography size 25 mm wide), and the adhesive tape and the film sample to be investigated with respect to its release properties are clamped in a tensile-testing machine (for example Zwick, model 1120,25 material-testing instrument) so that they are separated from one another at an angle of twice 90°. The force required to separate adhesive tape and composite is measured. The average of three measurements and the extent of any transfer of cold-seal adhesive to the adhesive tape are used for the assessment.

Measurement of the Seal Seam Strength of the Cold-Seal Adhesive

A sample of the release film is printed on the inside and/or laminated to a printed base film, the inside of the composite is subsequently coated with cold-seal adhesive in accordance with the processing instructions and, if necessary, dried, and allowed to condition through storage. The film surfaces covered with cold-seal adhesive are subsequently brought into contact with one another, apart from a strip with a width of a few centimeters for clamping in the testing machine, at the temperatures corresponding to the application and the manufacturer's processing conditions under a pressure of . . . N/cm², welded and cut into strips with a width of 15 mm, and the latter are clamped by means of the unwelded ends in a tensile-testing machine (for example Zwick, model 1120,25 material-testing instrument) in such a way that they are separated from one another at an angle of twice 90°. The force required to [lacuna] the two composite layers is measured. The average of three measurements is used for the assessment.

Molecular Weight Determination

The mean molecular weights Mw and Mn and the mean molecular weight dispersity Mw/Mn were determined in accordance with DIN 55 672, Part 1, by means of gel permeation chromatography. Instead of THF, the eluent used was ortho-dichlorobenzene. Since the olefinic polymers to be investigated are insoluble at room temperature, the entire measurement is carried out at elevated temperature ($\approx 135°$ C.).

EXAMPLE 1

A transparent three-layered film consisting of the base layer B and the top layers A and C with a total thickness of 20 µm was produced by coextrusion and subsequent stepwise orientation in the longitudinal and transverse directions. Top layers A and C each had a thickness of 0.6 µm.

B base layer 99.75% by weight of propylene homopolymer having a melting point of 165° C. and a melt flow index of 3.4 g/10 min, an n-heptane-insoluble content of 94% and stabilized with 0.07% of both Irganox 1010 and Irgafos 168 as well as 0.03% of DHT
0.15% by weight of erucamide
0.12% by weight of N,N-bisethoxyalkylamine (antistatic)

outer top layer:

98.67% by weight of propylene homopolymer having a melting point of 165° C. and a melt flow index of 7.6 g/10 min, an n-heptane-insoluble content of 94% and stabilized with 0.07% of both Irganox 1010 and Irgafos 168 as well as 0.03% of DHT
1.0% by weight of polyethylene wax having a mean molecular weight Mn of 2000 and a molecular weight distribution Mw/Mn of 1.08
0.33% by weight of $SiO_2$ as antiblocking agent having a mean particle size of 2 µm inner top layer:

99.8% by weight of random ethylene-propylene-butylene terpolymer having an ethylene content of 3% by weight and a butylene content of 7% by weight (remainder propylene) and a melt flow index of 7.3 g/10 min and stabilized with 0.07% of both Irganox 1010 and Irgafos 168 as well as 0.03% of DHT
0.1% by weight of erucamide
0.1% by weight of $SiO_2$ as antiblocking agent having a mean particle size of 3 µm The production conditions in the individual process steps were as follows:

| | | | |
|---|---|---|---|
| Extrusion: | temperatures | base layer: | 250° C. |
| | | top layers: | 250° C. |
| | temperature of the take-off roll: | | 20° C. |
| Longitudinal stretching: | temperature: | | 110° C. |
| | longitudinal stretching ratio: | | 5.5 |
| Transverse stretching: | temperature: | | 170° C. |
| | transverse stretching ratio: | | 9 |
| Setting: | temperature: | | 150° C. |
| | convergence: | | 10% |

The transverse stretching ratio $\lambda_T=9$ is an effective value. This effective value is calculated from the final film width B, reduced by twice the hem width b, divided by the width of the longitudinally stretched film C, likewise reduced by twice the hem width b.

EXAMPLE 2

The film produced as described in Example 1 was subsequently processed, as release film, into a film composite with a white-opaque base film. The base film employed was Trespaphan SHD. This is a four-layered, white-opaque BOPP film containing $CaCO_3$ and $TiO_2$ in the base layer and having a gloss interlayer of propylene homopolymer. The base film SHD was print-pretreated on both sides and printed over the entire area of its glossy (out)side with a nitrocellulose-based printing ink (MX57), and, after application of a solvent-free two-component PU adhesive to the printing ink, laminated with the print-pretreated inside of the release film as described in Example 1. The film composite produced in this way was coated over the entire area of the inside with various cold-seal adhesives as indicated in the table below. The coated composite films were rolled up and stored until tested. The test results are summarized in Table 1.

EXAMPLES 3 TO 9

Release films were produced in accordance with the conditions indicated in Example 1, with various waxes in varying proportions as shown in Table 1 being used in the outer top layer. The proportion of propylene homopolymer having a melt flow index of 7.6 g/10 min was selected in such a way that the total of the proportions of the various waxes and of the propylene homopolymer in each case gave 99.67% by weight.

The film samples were processed into a film composite with Trespaphan SHD under the conditions described in Example 2, and the composite produced in this way was coated with various cold-seal adhesives in each case as shown in Table 1.

EXAMPLE 10

A transparent four-layered film consisting of the base layer B, the top layers A and C and the interlayer D between the base layer and the top layer A with a total thickness of 20 μm was produced by coextrusion and subsequent stepwise orientation in the longitudinal and transverse directions. The top layers A and C each had a thickness of 0.6 μm, and the interlayer D had a thickness of 3 μm.

| B base layer |
| --- |
| 99.75% by weight of propylene homopolymer having a melting point of 165° C. and a melt flow index of 3.4 g/10 min, an n-heptane-insoluble content of 94% and stabilized with 0.07% of both Irganox 1010 and Irgafos 168 as well as 0.03% of DHT |
| 0.15% by weight of erucamide |
| 0.12% by weight of N,N-bisethoxyalkylamine (antistatic) |

| A outer top layer: |
| --- |
| 99.67% by weight of propylene homopolymer having a melting point of 165° C. and a melt flow index of 7.6 g/10 min, an n-heptane-insoluble content of 94% and stabilized with 0.07% of both Irganox 1010 and Irgafos 168 as well as 0.03% of DHT |
| 0.33% by weight of SiO$_2$ as antiblocking agent having a mean particle size of 2 μm |

| D interlayer: |
| --- |
| 85% by weight of propylene homopolymer having a melting point of 165° C. and a melt flow index of 7.6 g/10 min, an n-heptane-insoluble content of 94% and stablized with 0.07% of both Irganox 1010 and Irgafos 168 as well as 0.03% of DHT |
| 15% by weight of Chevron Wax 143 |

| C inner top layer: |
| --- |
| 85% by weight of random ethylene-propylene-butylene terpolymer having an ethylene content of 3% by weight and a butylene content of 7% by weight (remainder propylene) and a melt flow index of 7.3 g/10 min and stabilized with 0.07% of both Irganox 1010 and Irgafos 168 as well as 0.03% of DHT |
| 0.1% by weight of erucamide |
| 0.1% by weight of SiO$_2$ as antiblocking agent having a mean particle size of 3 μm |

The production conditions in the individual process steps were as follows:

| Extrusion: | temperatures | base layer: | 250° C. |
| --- | --- | --- | --- |
| | | interlayer: | 250° C. |
| | | top layers: | 250° C. |

All further conditions corresponded to those indicated in Example 1.

The release film produced in this way was processed into a film composite with Trespaphan SHD under the conditions described in Example 2, and the composite produced in this way was coated with various cold-seal adhesives in each case as shown in Table 1.

EXAMPLE 11

A film sample was produced in accordance with the conditions indicated in Example 7, with the homopolymer in the outer top layer being replaced by a propylene-ethylene copolymer containing 6% by weight of ethylene.

The film sample was processed into a film composite under the conditions described in Example 2, and the composite produced in this way was coated with various cold-seal adhesives in each case as shown in Table 1.

EXAMPLE 12

A film sample was produced in accordance with the conditions indicated in Example 7, with the homopolymer in the outer top layer being replaced by a propylene-ethylene-butylene copolymer containing 2% by weight of ethylene and 6% by weight of butylene.

The film sample was processed into a film composite under the conditions described in Example 2, and the composite produced in this way was coated with various cold-seal adhesives in each case as shown in Table 1.

EXAMPLE 13

A film sample was produced in accordance with the conditions indicated in Example 7, with the homopolymer being replaced by a blend of 98.8% by weight of propylene homopolymer and 1.2% by weight of polydimethylsiloxane (viscosity 30,000 centistokes).

The film sample was processed into a film composite under the conditions described in Example 2, and the composite produced in this way was coated with various cold-seal adhesives in each case as shown in Table 1.

EXAMPLES 14 TO 16

Film samples were produced in accordance with the conditions indicated in Example 7, with the Polywax 655 being replaced by Polywax 1000.

The film samples were processed into a film composite under the conditions described in Example 2, with various lamination adhesives being used for the production of the composite as shown in Table 2. The composite films produced in this way were coated with various cold-seal adhesives in each case as shown in Table 2.

EXAMPLE 17

A film sample was produced in accordance with the conditions indicated in Example 7.

The film sample was, as release film, processed into a film composite by the extrusion-lamination process using a metallized biaxially oriented polypropylene film (Trespaphan SCM) as base film. To this end, the release film was printed by the reverse print process with a striped pattern of various ink application thickness using PVB ink and laminated to the metal-coated side of the metallized film with supply of 4 g/m$^2$ of low-density polyethylene at a melting point of 220° C. The composite produced in this way was flame-treated on the inside with natural gas at a flame temperature of 780° C. The composite films produced in this way were coated with various cold-seal adhesives in each case as shown in Table 2.

COMPARATIVE EXAMPLE 18

A film sample was produced in accordance with the conditions indicated in Example 1, with a mixture of 99.67% by weight of the propylene homopolymer described therein and 0.33% by weight of $SiO_2$ as antiblocking agent being employed in the outer top layer.

The film sample was processed into a film composite under the conditions described in Example 2, and the composite produced in this way was coated with various cold-seal adhesives in each case as shown in Table 2.

COMPARATIVE EXAMPLE 19

A film sample was produced in accordance with the conditions indicated in Comparative Example 18, with the homopolymer being replaced by a blend of 98.8% by weight of propylene homopolymer and 1.2% by weight of polydimethylsiloxane (viscosity 30,000 centistokes), based on the homopolymer content.

The film sample was processed into a film composite under the conditions described in Example 2, and the composite produced in this way was coated with various cold-seal adhesives in each case as shown in Table 2.

EXAMPLE 20

A film sample was produced in accordance with the conditions indicated in Example 7, but the output rate of the extruder which provides the melt for the production of the base layer was set in such a way that the total thickness of the film was 35 μm.

The film sample was printed by the reverse print process with a striped pattern of various ink application thickness using PVB ink and was processed into a packaging monofilm without lamination and divided.

The packaging monofilm produced in this way was coated with various cold-seal adhesives in each case as shown in Table 2.

EXAMPLES 21 TO 22

Film samples were produced in accordance with the conditions indicated in Examples 14 to 16.

The film samples were processed into a film composite under the conditions described in Example 2, with the lamination adhesive [PU] being used to produce the composite. The composite films produced in this way were in each case coated directly without interim storage using the cold-seal adhesives indicated in Table 1.

TABLE 1

In each case laminated with SHH, printed with MX57 printing ink and laminated with PU adhesive . . .

| Example | Wax | Proportion in outer top layer | Croda 22-392 | Croda 22-272 | Swale IP 4180 2) | Atofindley CX-7117 | Atofindley C-1381 |
|---|---|---|---|---|---|---|---|
| E1, E2 | Polywax 2000 | 1.0% | B = 0.7 | B = 0.5 | B = 0.4 | B = 0.2 | B = 0.5 |
| E3 | Polywax 2000 | 5% | B = 0.8 | B = 0.2 | B = 0.1 | B = 0.3 | B = 0.4 |
| E4 | Polywax 2000 | 20% | B = 0.6 | B = 0.2 | B = 0.0 | B = 0.1 | B = 0.5 |
| E5 | Polywax 500 | 1.0% | B = 0.7 | B = 0.6 | B = 0.0 | B = 0.5 | B = 0.3 |
| E6 | Polywax 500 | 0.5% | B = 1.0 | B = 0.6 | B = 0.4 | B = 0.8 | B = 0.9 |
| E7 | Polywax 655 | 1.0% | B = 0.7 | B = 0.5 | B = 0.4 | B = 0.2 | B = 0.5 |
| E8 | Multiwax 445 | 10% | B = 0.8 | B = 0.7 | B = 0.9 | B = 0.3 | B = 0.2 |
| E9 | Polywax 1000 | 15% 3) | B = 0.9 | B = 0.2 | B = 0.3 | B = 0.0 | B = 0.2 |
| E10 | Chevron Wax 143 | 15% 3) | B = 0.9 | B = 0.8 | B = 0.6 | B = 0.6 | B = 0.9 |
| E11 | Polywax 655 | 1% 4) | B = 0.9 | B = 0.6 | B = 0.6 | B = 0.5 | B = 0.9 |
| E12 | Polywax 655 | 1% 5) | B = 0.5 | B = 0.6 | B = 0.3 | B = 0.3 | B = 0.7 |
| E13 | Polywax 655 | 1% 6) | B = 0.5 | B = 0.5 | B = 0.2 | B = 0.1 | B = 0.3 |
| E21 | Polywax 1000 | 1.0% | B = 0.8 | | | | |
| | | | A = 3.1 | | | | |
| | | | S = 1.9 | | | | |
| E22 | Polywax 1000 | 1.0% | | | | | B = 1.0 |
| | | | | | | | A = 3.5 |
| | | | | | | | S = 2.2 |

1) "B" = blocking force, "A" = anchoring, "S" = seal seam strength 2) on SHD/ the inside of the base film was not print-pretreated 3) in interlayer 4) in C3/C2 copolymer 5) in C3C2C4 terpolymer 6) in homopolymer with siloxane E = Example; CE = Comparative Example

TABLE 2

In each case 1.0% of Polywax 1000 in the outer top layer laminated to SHH

| Example | Lamination adhesive | Croda 22-392 | Croda 22-272 | Swale IP 4180 *) | Atofindley CX-7117 | Atofindley C-1381 |
|---|---|---|---|---|---|---|
| E14 | PU | B = 0.6 | B = 0.4 | B = 0.3 | B = 0.5 | B = 0.8 |
|  |  | A = 3.2 | A = 2.7 | A = 2.7 | A = 2.6 | A = 3.3 |
|  |  | S = 2.2 | S = 1.9 | S = 2.1 | S = 1.8 | S = 2.4 |
| E15 | Epoxy | B = 0.7 | B = 0.4 | B = 0.3 | B = 0.4 | B = 0.7 |
|  |  | A = 3.3 | A = 2.6 | A = 2.7 | A = 2.7 | A = 3.5 |
|  |  | S = 2.1 | S = 1.8 | S = 1.8 | S = 2.0 | S = 2.1 |
| E16 | Solvent | B = 0.8 | B = 0.5 | B = 0.2 | B = 0.1 | B = 0.6 |
|  |  | A = 2.8 | A = 2.5 | A = 2.4 | A = 2.6 | A = 3.1 |
|  |  | S = 2.3 | S = 1.9 | S = 2.0 | S = 1.9 | S = 1.8 |
| E17 | PE-LD type 1) | B = 0.9 | B = 0.6 | B = 0.3 2) | B = 0.3 | B = 0.7 |
|  |  | A = 3.1 | A = 2.8 | A = 2.9 | A = 2.8 | A = 3.1 |
|  |  | S = 2.4 | S = 1.7 | S = 2.2 | S = 2.1 | S = 2.1 |
| CE18 | PU | B = 1.1 | B = 1.3 | B = 0.4 | B = 0.5 | B = 2.8 |
|  |  | A = 2.8 | A = 2.7 | A = 2.9 | A = 2.8 | A = 3.5 |
|  |  | S = 2.1 | S = 1.8 | S = 1.9 | S = 1.9 | S = 2.3 |
| CE19 | PU 6) | B = 0.7/1.5 | B = 1.4/1.2 | B = 0.4/1.1 | B = 0.3/0.9 | B = 0.8/2.1 |
|  |  | A = 2.5/2.6 | A = 2.5 | A = 2.6/2.2 | A = 2.7 | A = 3.0/2.4 |
|  |  | S = 1.9/1.8 | S = 2.1 | S = 1.7/1.8 | S = 1.9 | S = 1.5/2.0 |
| E20 | none | B = 0.6 | B = 0.4 | B = 0.3 | B = 0.5 | B = 0.8 |
|  |  | A = 2.8 | A = 2.5 | A = 2.8 | A = 2.6 | A = 3.1 |
|  |  | S = 2.1 | S = 1.7 | S = 2.3 7) | S = 1.6 | S = 2.1 7) |

*) on SHD
1) on SCM
2) composite without flame treatment
6) with siloxane
7) anchoring partially failed
E = Example; CE = Comparative Example

The invention claimed is:

1. Method of making a laminate from a base film and a release film comprising the step of laminating together the base film and the release film,
   wherein the release film is a multilayered biaxially oriented polyolefin film comprising a base layer and at least one outer top layer
   wherein said multilayered film comprises a migratory polyethylene wax having a molecular weight distribution, Mw/Mn, of less than 3 in at least one layer, and wherein the layer which is intended for lamination with the base film is essentially free from wax and the polyethylene wax is migratory at ambient temperature.

2. Method according to claim 1, wherein the release film is a two- or three-layered film, and the wax is present in the base layer.

3. Method according to claim 1, wherein the release film has an interlayer which is located between the base layer and an outer top layer, and the wax is present in the interlayer.

4. Method according to claim 1, wherein the wax is present in the outer top layer of the release film.

5. Method according to claim 1, wherein the wax is a polyethylene wax having a molecular weight Mn of from about 200 to about 5000.

6. Method according to claim 5, wherein the wax is a polyethylene wax having an Mw/Mn of from about 1 to about 2.

7. Method according to claim 1, wherein the polyolefin film is a polypropylene film.

8. Method according to claim 1, wherein the outer top layer consists essentially of propylene homopolymer.

9. Method according to claim 1, wherein the wax is present in the wax-containing layer of the release film in a concentration of from about 0.2 to about 20% by weight, based on the weight of the layer.

10. Method according to claim 1, wherein the surface of the release film which is intended for lamination has been corona-, plasma- or flame-treated.

11. Method according to claim 1, wherein the surface of the release film which is not intended for lamination is untreated.

12. Laminate comprising a polyolefinic base film which is laminated with a release film by means of lamination adhesive or by means of extrusion lamination,
   wherein the base film has a cold-seal adhesive on its surface which is not intended for lamination, and the release film comprising a base layer, an outer top layer and an intermediate layer between the base layer and the outer top layer, wherein the release film comprises a migratory wax in the base layer or in the interlayer or in the outer top layer, and the polyethylene wax is migratory at ambient temperature.

13. Laminate according to claim 12, wherein the base film is a multilayered biaxially oriented polypropylene film, a polyethylene terephthalate film, a cast film or a metallized film.

14. Laminate according to claim 12, wherein the base film has been printed on its surface which is intended for lamination.

15. Laminate according to claim 12, wherein the release film is provided with reverse printing on its surface intended for lamination.

16. Method of making a package, comprising the step of converting a laminate according to claim 12 into a package.

17. Method according to claim 16, wherein the release film forms the outside of the package.

18. Packaging film comprising a laminate according to claim 12.

19. A laminate comprising a base film, a release film, and a lamination adhesive disposed between said base film and said release film, said release film comprising a base layer formed from a first composition, an outer top layer formed from a second composition, a first intermediate layer formed from a third composition disposed between said base layer and said base film, and a second intermediate layer formed from a fourth composition disposed between said base layer and said outer top layer, the compositions used to form said second intermediate layer and/or said base layer alone comprising a wax, said wax absent from the composition used to form said first intermediate layer and said outer top layer, wherein said wax is migratory at ambient temperature.

20. A laminate comprising a base film, a surface treated release film, and a lamination adhesive disposed between said base film and said release film, said release film comprising a base layer formed from a first composition disposed between an outer top layer formed from a second composition and said base film, said release film further optionally comprising a third layer formed from a third composition disposed between said base layer and said base film, at least one of said second and/or first compositions used to form said outer top layer and/or said base layer comprising a migratory wax and at least one of said first and/or third compositions used to form said base layer and said optional third layer comprising at least one higher aliphatic acid amide, said migratory wax absent from the composition used to form the layer adjacent said base film and said at least one higher aliphatic acid amide absent from said second composition used to form said outer top layer, wherein said migratory wax is migratory at ambient temperature.

21. A laminate according to claim 20, wherein said release film comprises said third layer and said first composition used to form said base layer comprises about 50% more of said higher aliphatic acid amide than said third composition used to form said third layer.

22. A laminate according to claim 21, wherein said third composition used to form said third layer comprises a random ethylene-propylene-butylene copolymer.

* * * * *